Jan. 14, 1958     H. L. BAKER     2,819,690
FIGURE MOLD FOR FROZEN SUCKERS
Filed July 5, 1955

INVENTOR.
Harold L. Baker
BY
ATTORNEY.

United States Patent Office 2,819,690
Patented Jan. 14, 1958

2,819,690
FIGURE MOLD FOR FROZEN SUCKERS

Harold L. Baker, Kansas City, Mo., assignor of one-third to Otis D. Elliott and one-third to Robert K. Treasure, Mission, Kans.

Application July 5, 1955, Serial No. 519,855

1 Claim. (Cl. 107—19)

This invention relates to a mold for producing frozen suckers, the primary object being to provide an inexpensive unitary structure adapted for use in the home or otherwise for receiving edible material that may be frozen and made in its entirety from flexible material in a manner to permit removal of the suckers therefrom readily and easily.

It is the most important object of the present invention to provide a mold of the aforementioned character that includes a plurality of side-by-side tubular elements closed at one end thereof and having means at the open ends for retaining a stick or handle while the same is being frozen into the material forming the suckers.

A further object of the instant invention is the provision of a mold having a series of cylindrical portions or elements that are interconnected but in intercommunication by virtue of slots therebetween so that the entire mold may be easily filled with the liquid to be frozen and to the end that the same may be separated from the frozen suckers by merely flexing the material from which the mold is made.

Other objects include important details of construction to be made clear as the following specification progresses, reference being had to the accompanying drawing wherein.

Figure 1:
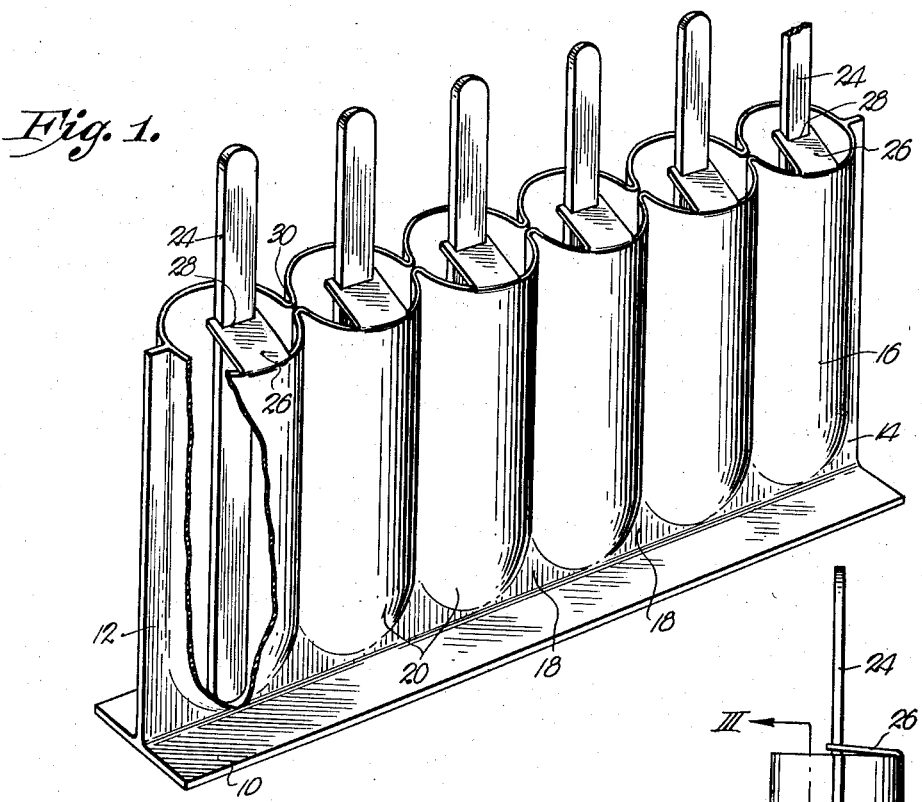
Figure 1 is a perspective view of the figure mold for frozen suckers made pursuant to my present invention, parts being broken away and in section to reveal details of construction.
Figure 3:
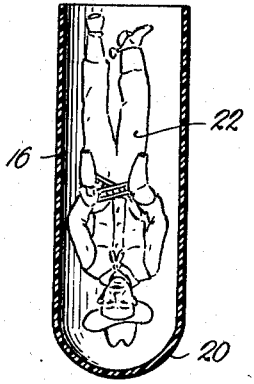
Fig. 3 is a cross-sectional view taken on line III—III of Fig. 2.
Figure 2:
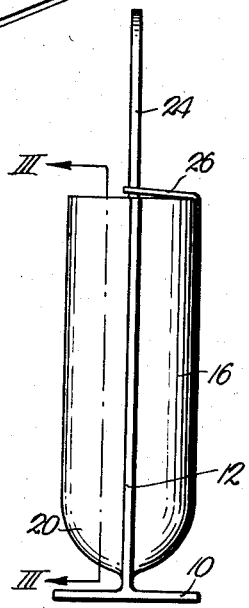
Fig. 2 is an end elevational view thereof.

The one-piece, unitary mold forming the embodiment of my invention shown in Figs. 1 to 3 inclusive, is preferably made from a suitable flexible material such as rubber or plastic and includes a relatively long, rectangular base 10, having a flat, lowermost surface and provided with integral reinforcing ribs 12 and 14 at the ends thereof and perpendicular thereto.

Ribs 12 and 14, as well as tubular elements 16 and interconnecting gussets 18, are all molded or otherwise formed integral with the base 10. It is to be noted that the uppermost ends of the series of side-by-side, interconnected cylindrical elements 16, are open, whereas the lowermost ends 20 thereof, which are joined integrally with the base 10 and with the interconnecting gussets 18, are closed and dome-shaped.

A suitable figure or design 22 is engraved within each element 16 respectively as seen in Fig. 3 of the drawing, and each element 16 is also provided with retainer means for holding a handle or stick 24 in place within the elements 16 during freezing of the material therearound.

In the form of my invention shown by Figs. 1 to 3 inclusive, such retainer takes the form of an inturned radial flap or ear 26, integral with each element 16 respectively at the uppermost end thereof. Ears 26 are provided with slots 28 that frictionally receive the handles 24 in the manner shown by Figs. 1 and 2. The ears 26 are flexible to the end that the same readily yield out of the way when the frozen suckers are removed from the elements 16.

It is to be preferred that the elements 16 be in intercommunication and to this end, longitudinal slots 30 are provided therebetween, the slots 30 extending to a point adjacent the dome-shaped ends 20 or gussets 18.

Figure 4:
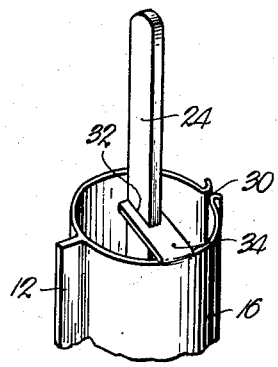
Fig. 4 is a fragmentary, perspective view of a modified form of the invention.

It is to be noted that the slots 28 of ears 26 are disposed to hold the handles 24 in coplanar relationship, whereas in Fig. 4 of the drawing, slots 32 of ears 34 extend in the opposite direction.

In use, the liquid to be frozen within the mold may be poured into the elements 16 while the mold rests upon the base 10, whereupon handles 24 may be placed in the elements 16 and slipped into place within the slots 28 or 32 as the case may be. Thereupon, the mold may be placed in a freezing compartment of a refrigerator and after the ingredients are frozen around the handles 24, they can be easily removed by merely flexing the semicircular sections of the elements 16 apart. The finished sucker will assume the shape and configuration of the elements 16 and of the figure or design 22 embossed thereon.

Having thus described the invention what is claimed as new and desired to be secured by Letters Patent is:

A unitary, one piece mold for frozen suckers comprising an aligned row of side-by-side, elongated, cylindrical elements of distortable, flexible material, each of said cylinders being integrally interconnected to the cylinders next adjacent thereto at the point of juncture therebetween, there being longitudinal slots in each of said points of juncture between the cylinders for placing the latter into intercommunication, each of said cylinder being provided with a closed, substantially hemispherical end portion; an elongated, horizontal base having its longitudinal axis in alignment with the row of elements, the base integrally joining said one end of the elements for holding the latter in a normally upright position, the other end of the elements being open; a retainer for each element respectively at the open end thereof for holding a sucker handle in place therewith; gussets joining the hemispherical end portions of the elements, said gussets being integrally connected with the base; and a reinforcing rib at each end of the row of elements, each of said ribs extending the longitudinal length of its respective cylinder and integrally connected to the cylinder and to the base, said retainers comprising flexible ears integrally connected to the uppermost edges of each of the elements respectively, and extending radially therefrom over the open end, each of said ears having a slot disposed substantially on the longitudinal axis of the element for receiving said handles.

References Cited in the file of this patent
UNITED STATES PATENTS

| | | |
|---|---|---|
| 1,675,599 | Copeman | July 3, 1928 |
| 1,717,407 | Radford | June 18, 1929 |
| 1,828,693 | Van Devanter | Oct. 20, 1931 |
| 1,881,817 | Meyer | Oct. 11, 1932 |
| 1,965,394 | Schnaier | July 3, 1934 |
| 1,987,945 | Schnaier | Jan. 15, 1935 |
| 2,642,820 | Lund | June 23, 1953 |

FOREIGN PATENTS

| | | |
|---|---|---|
| 848,960 | France | Aug. 7, 1939 |